D. WAIDE.
Boots and Shoes.

No. 155,557. Patented Sept. 29, 1874.

WITNESSES
Henry N. Miller
C. L. Everts

INVENTOR
Daniel Waide,
per Alexander H. Mason
Attorneys

UNITED STATES PATENT OFFICE.

DANIEL WAIDE, OF LEXINGTON, KENTUCKY.

IMPROVEMENT IN BOOTS AND SHOES.

Specification forming part of Letters Patent No. 155,557, dated September 29, 1874; application filed July 29, 1874.

*To all whom it may concern:*

Be it known that I, DANIEL WAIDE, of Lexington, in the county of Fayette and in the State of Kentucky, have invented certain new and useful Improvements in Boots and Shoes; and do hereby declare that the following is a full, clear, and exact description thereof, reference being had to the accompanying drawings, and to the letters of reference marked thereon, making a part of this specification.

The object of my invention is to prevent the screeching of boots and shoes; and it consists in the employment of a thin layer or sheet of perforated rubber between the soles, or in any place where two pieces of leather would come in contact, as will be hereinafter more fully set forth.

In order to enable others skilled in the art to which my invention appertains to make and use the same, I will now proceed to describe its construction and operation, referring to the annexed drawing, in which—

Figure 1:
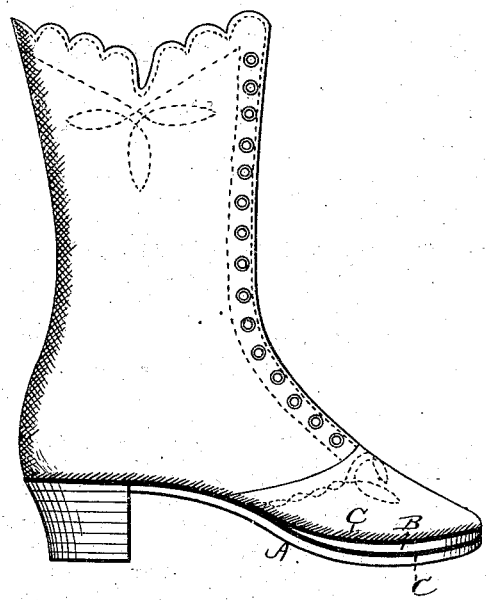
Figure 2:
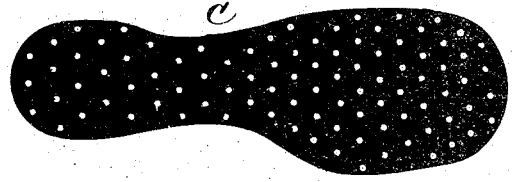

Figure 1 is a side elevation of a shoe embodying my invention, and Fig. 2 is a plan view of a sheet of perforated rubber used therein.

A represents the outer, and B the middle or inner, sole of a shoe, between which is laid a thin layer or sheet of perforated rubber, C.

Similar sheets or pieces should be placed or laid at any point where otherwise two pieces of leather would come in contact, whereby the disagreeable and annoying screeching of boots and shoes is entirely avoided.

I am aware solid sheets of rubber have been used in boots and shoes for the purpose of making them water-proof, and I do not claim such as my invention. Such solid sheets of rubber prevent all ventilation, which is so necessary to the proper care of the feet.

My invention is the interposition of the perforated rubber sheets, which do not render the shoe water-proof, but accomplish the object desired of rendering it screechless, at the same time allowing of the same ventilation as if the rubber were not there.

Having thus fully described my invention, what I claim as new, and desire to secure by Letters Patent, is—

The combination, with the sole of a boot or shoe, of one or more perforated sheets or layers, C C, of rubber, for the purposes herein set forth.

In testimony that I claim the foregoing I have hereunto set my hand this 27th day of June, 1874.

DANL. WAIDE.

Witnesses:
    JOS. SMITH, Jr.,
    H. C. BRENNAN.